INVENTORS
David H. Robinson and
Ted E. Dunn
By J. L. Whittaker
ATTORNEY

Patented Dec. 12, 1950

2,533,898

UNITED STATES PATENT OFFICE 2,533,898

RADIO DISTANCE MEASURING SYSTEM

David H. Robinson, Llanerch, Pa., and Ted E. Dunn, Pennsauken, N. J., assignors to Radio Corporation of America, a corporation of Delaware Application June 2, 1948, Serial No. 30,604

4 Claims. (Cl. 343—12)

1

This invention relates to improvements in radio distance measuring systems such as absolute altimeters or terrain clearance indicators, and more particularly to means and methods for preventing erroneous indications by such systems in response to signals reflected from points beyond the normal operating ranges thereof, by driving the indicator off scale and producing a warning signal in response to decrease in the amplitude of the reflected signal below a predetermined value.

The present invention has particular, though not exclusive, applicability to radio altimeters of the well-known frequency modulated type and will be described herein in connection with such a system. However, as will be made clear hereinafter, the invention may be used also with altimeters of other types, as well as with distance measuring systems other than altimeters.

Figure 1:
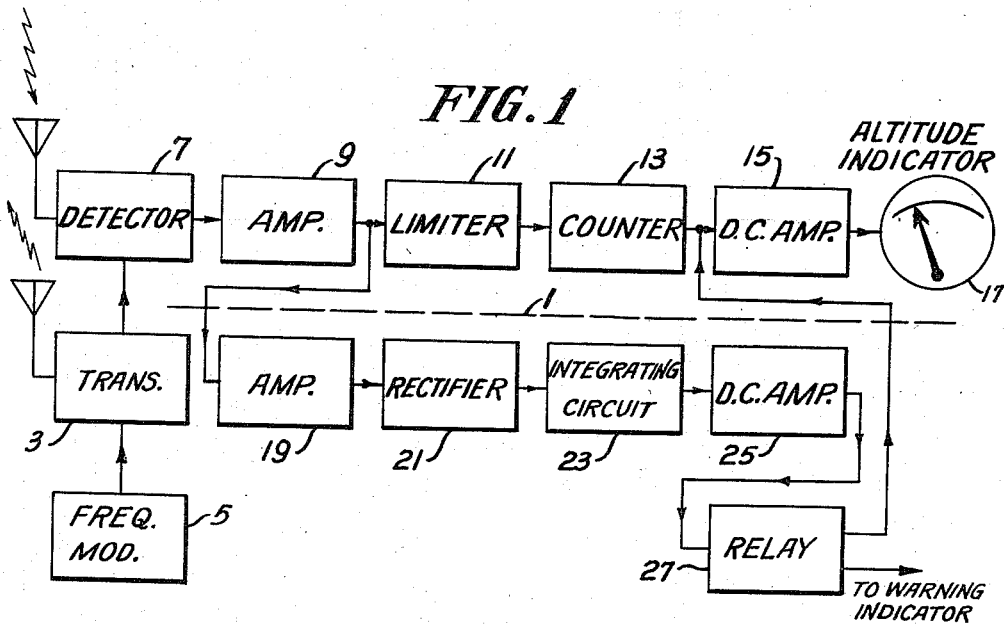
Figure 2:
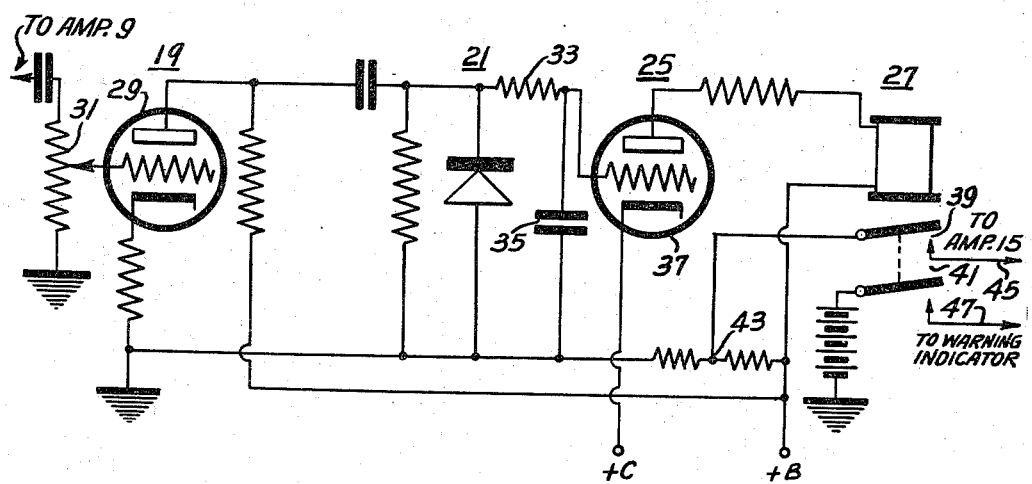

In the following description reference will be made to the accompanying drawings, wherein:

Figure 1 is a schematic block diagram of a frequency modulation radio altimeter including a preferred embodiment of the invention, and Figure 2 is a circuit diagram of a preferred embodiment of a "drop-out" amplifier and relay circuit included in the system of Figure 1.

The upper portion of Figure 1, above the dash line 1, represents a known type of altimeter such as that manufactured by the Radio Corporation of America and designated AVQ-6. Said altimeter comprises a transmitter 3 which is periodically varied in frequency by a frequency modulator 5, a receiver including a detector 7 and an audio amplifier 9, and beat frequency responsive means comprising a limiter 11, an averaging cycle counter 13, a D.-C. amplifier 15, and a current meter 17.

In the operation of the altimeter, frequency modulated waves radiated by the transmitter 3 are reflected from the earth's surface, some of the reflected signal being received and applied to the detector 7 together with a small portion of the direct output of the transmitter 3. The two inputs to the detector 7 differ in frequency by an amount equal to the product of the rate of change of frequency and the total distance travelled by the signals, from the transmitter to the surface and back to the receiver. The detector 7 produces a beat signal output whose frequency is the difference between said input frequencies. Since the rate of change of frequency effected by the modulator 5 is ordinarily non-uniform, at least during part of the modulation cycle, the beat frequency will vary cyclically although the distance remains constant. However, the average beat frequency, i. e. the number of beat cycles per modulation cycle, will be proportional to the distance travelled by the radiation, and hence to the altitude.

The counter 13 provides a D.-C. output whose

2 magnitude is a more or less linear function of the frequency of the input thereto, and will also depend directly upon the amplitude of the input. The limiter 11 maintains said amplitude constant, subject to the condition that the beat signal, after amplification by the amplifier 9, is greater than a certain minimum amplitude. Thus, the D.-C. output of the counter 13 will vary only with variations in altitude.

The counter output is amplified by the amplifier 15 and applied to the current meter 17, which is calibrated in units of distance, such as feet. In a typical altimeter of the described type, the scale covers the range 0-4000 feet.

As a craft carrying the altimeter ascends beyond 4000 feet (or whatever the full scale indication of the meter 17 happens to be), the equipment continues to operate as described, simply deflecting the meter off-scale beyond its maximum. This state of affairs continues until the craft reaches an altitude of say, 8000 feet. Then the reflected signal may become too weak to produce a beat signal exceeding the level at which the limiter 11 is set to operate. The output of the counter 13 will decrease accordingly, and finally the meter 17 will indicate altitudes less than 4000 feet, although the aircraft may be higher than 8000 feet.

It will be evident that the indicator will also read low when for any other reason the reflected signal is insufficient to operate the limiter. According to the present invention, means are provided for monitoring the received signal and indicating when it is not enough to give a correct indication. Referring to the lower part of Figure 1, an amplifier 19 is connected to the output of the amplifier 9 and supplies a rectifier circuit 21. The output of the rectifier 21 goes through a filter and integrating circuit 23 to a D.-C. amplifier 25. The output of the amplifier 25 is applied to a relay circuit 27, which is connected to close when the output of the rectifier 21 is less than a predetermined amount. When closed, the relay circuit 27 applies a bias to the D.-C. amplifier 15 such as to throw the indicator 17 beyond its full scale position. The relay 27 is also connected to an alarm or warning device (not shown) such as a flag annunciator or the like.

The output of the amplifier 19 is similar to the beat signal input to the limiter 11, and varies in the same way. The rectifier 21 provides a D.-C. output whose magnitude is proportional to the amplitude of the beat signal. The integrating circuit not only removes the beat frequency pulsations in the rectifier output but also introduces a considerable lag in any variations of the rectifier output, so that momentary signal failures, such as may be caused by flight over certain types of terrain, will not reduce substantially the D.-C. voltage applied to the amplifier 25.

Under normal operating conditions, the relay 27 is held open. When the amplitude of the beat signal decreases to an average value less than that ordinarily encountered in normal operation, the relay 27 operates to actuate the warning indicator and throw the meter 17 off scale. The gain of the amplifier 19 may be adjusted to set the beat signal lever at which this will occur.

Although the details of the relay channel are not essential to a clear understanding of the present invention, a preferred embodiment thereof is shown in Figure 2. The amplifier 19 is simply a resistance coupled audio amplifier, including a tube 29 which may be half of a double triode such as a 12AT7. The amplifier 19 includes a gain control 31 for use as a set-up adjustment.

The rectifier 21 is a crystal of the type designated in the radio art as a 1N34. The integrating circuit comprises a filter section including a series resistor arm 33 and a shunt capacitor arm 35. The D.-C. amplifier 25 includes a triode, preferably the other half of the same tube structure including the tube 29. The cathode of the triode is biassed positive with respect to ground. The rectifier 21 is poled to apply positive voltage to the grid.

When the rectifier output is less than a certain value, the tube 37 is cut off by its cathode bias and the relay 27 is deenergized. The relay contacts 39 and 41 close upon de-energization of the actuating winding, applying about 70 volts from the voltage divider 43 to the D.-C. amplifier 15 over the conductor 45, and energizing the warning indicator by way of the conductor 47.

Although a specific embodiment of the invention has been described, in combination with a frequency modulated altimeter, it will be apparent that the principle thereof can be applied to other frequency modulated distance measuring equipment. Moreover, other types of radio altimeters tend to falsely indicate low altitudes when beyond maximum ranges. Substantially the same arrangement as described herein may be used to provide a warning and/or to disable the indicator in such cases.

We claim as our invention:

1. In a radio distance measuring system including means transmitting frequency modulated signals to an object whose distance is to be measured, means receiving said signals after reflection by said object, means combining said received signals with said transmitted signals to produce a beat signal whose frequency corresponds to said distance, means limiting the amplitude of said beat signal, and indicator means responsive to said amplitude limited beat signal to indicate said distance: apparatus for preventing false indications by said system in response to objects beyond the maximum range at which said system is to operate, including means responsive to the amplitude of said beat signal before limiting to provide a control voltage, and relay means responsive to said control voltage to bias said indicator beyond its full scale indication in response to said control voltage being below a predetermined value.

2. In a radio distance measuring system including means transmitting signals to an object whose distance is to be measured, means receiving said signals after reflection by said object, means comparing said received signals with said transmitted signals to produce a further signal which corresponds to said distance, and indicator means responsive to said last-mentioned signal to indicate said distance: apparatus for preventing false indications by said system in response to objects beyond the maximum range at which said system is to operate, including means responsive to said received signals to provide a control voltage whose amplitude corresponds to that of said received signals, means integrating variations of said control voltage with respect to time, means responsive to said integrated control voltage to bias said indicator beyond its full scale indication in response to said integrated control voltage being below a predetermined threshold value, a warning device, and means actuating said warning device in response to said integrated control voltage being below said predetermined value.

3. In a radio distance measuring system including means transmitting signals to an object whose distance is to be measured, means receiving said signals after reflection by said object, means comparing said received signals with said transmitted signals to produce a further signal which corresponds to said distance, limiter means to prevent said further signal from exceeding a predetermined amplitude, and indicator means responsive to said amplitude limited signal to indicate said distance: apparatus for preventing false indications by said system in response to received signals of insufficient strength to operate said limiter, including means responsive to said further signal to provide a control voltage whose amplitude corresponds to that of said received signals, and means to produce an indication in response to said control voltage being below a predetermined value.

4. In a radio distance measuring system including means transmitting signals to an object whose distance is to be measured, means receiving said signals after reflection by said object, means comparing said received signals with said transmitted signals to produce a further signal which corresponds to said distance, and indicator means responsive to said last-mentioned signal to indicate said distance: apparatus for preventing false indications by said system in response to objects beyond the maximum range at which said system is to operate, including means responsive to said further signal to provide a control voltage, and means to bias said indicator beyond its full scale indication and produce a warning indication in response to said control voltage falling below a predetermined value.

DAVID H. ROBINSON.
TED E. DUNN.

REFERENCES CITED

The following references are of record in the file of this patent:

UNITED STATES PATENTS

| Number | Name | Date |
|---|---|---|
| 2,268,587 | Guanella | Jan. 6, 1942 |
| 2,393,624 | Ferrill | Jan. 29, 1946 |
| 2,403,527 | Hershberger | July 9, 1946 |
| 2,421,785 | Hathway | June 10, 1947 |
| 2,426,182 | Lange | Aug. 26, 1947 |

FOREIGN PATENTS

| Number | Country | Date |
|---|---|---|
| 579,090 | Great Britain | July 23, 1946 |